Oct. 4, 1932.  W. C. JACKSON  1,881,231
BUMPER GUARD
Filed May 2, 1932
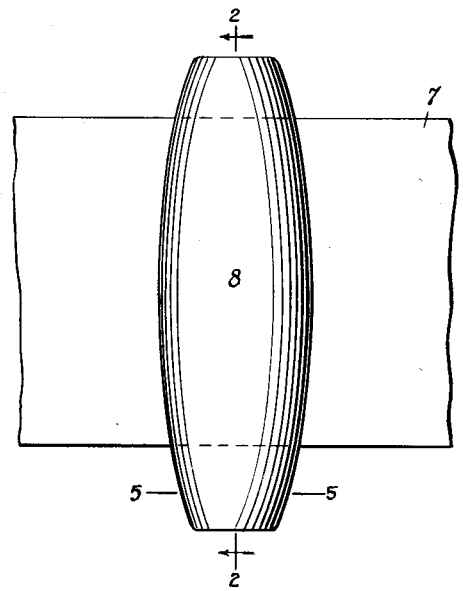
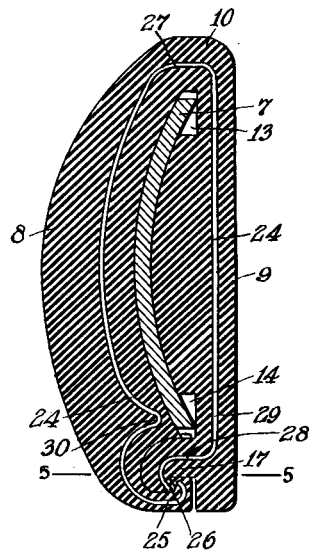
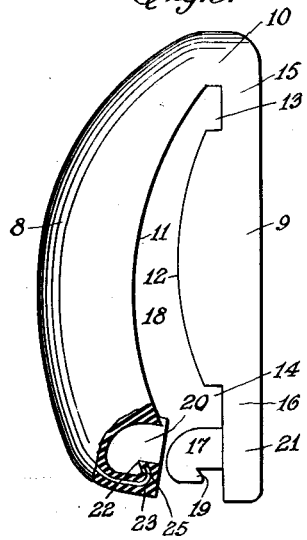
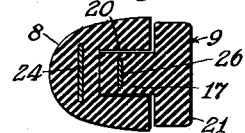
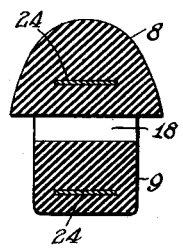
INVENTOR
WALTER C. JACKSON
BY
ATTORNEY Patented Oct. 4, 1932

1,881,231

UNITED STATES PATENT OFFICE

WALTER C. JACKSON, OF RAHWAY, NEW JERSEY, ASSIGNOR TO TINGLEY RELIANCE RUBBER CORPORATION, OF RAHWAY, NEW JERSEY, A CORPORATION OF NEW JERSEY

BUMPER GUARD

Application filed May 2, 1932. Serial No. 608,589.

This invention relates to devices for protecting bumpers of automobiles, and has for an object to provide a device of this character which may be readily molded from plastic material, preferably rubber, and which may be readily economically commercially manufactured.

Another object of the invention is to provide a device of this character which may be readily applied to the bumper of an automobile and which, when applied and locked, cannot be removed from the bumper without its complete destruction.

Another object of the invention is to provide a device of this character which, when applied and securely locked in position on the bumper may, neverthless, be adjusted longitudinally upon the bumper.

Another object of the invention is to provide a molded, vulcanized rubber device for protecting automobile bumpers, and which has encased within it a spring steel device affording reinforcement for the interlocking elements, and which steel device also prevents the cutting off of the device with a knife, and also which steel is resistant to most of the implements which would ordinarily be used by one endeavoring to remove the device.

Another object of the invention is to provide a device of this character formed of molded, vulcanized rubber in the form of a loop having a recess for receiving the bumper and having at its ends interlocking devices.

Many of the refinements relating to this invention which go to make a practicable and operative device are developed later in the specification.

In the accompanying drawing one practicable embodiment of my invention is illustrated, wherein:

Figure 1 shows a face view of one of my improved guards attached to a broken away portion of an automobile fender.

Fig. 2 is a longitudinal section of the guard taken at about the plane indicated by the line 2—2 in Fig. 1, the bumper being illustrated in this view in cross-section.

Fig. 3 is a side view of the guard, the locking devices being disengaged and the guard in position for application to a bumper.

Fig. 4 is a central cross-section of the guard, the parts being in their bumper engaging position, but the representation of the bumper is omitted from this view, and Fig. 5 is a cross-section taken at about the plane of the line 5—5 of Figs. 1 and 2.

According to prevailing practice automobile bumpers are made from wide bars of steel to which is applied a shiny or highly polished surface, the present fad being chromium plating. Of course the bumper is designed for taking the rough blows and knocks incident to one car running into another, which includes the side-swiping of one bumper with another when cars are moving into and out of parking positions. The bumper, instead of being regarded solely for its utilitarian purposes, has now become one of the highly ornamental features of the vehicle, but it still has to take the hard knocks of traffic, which knocks soon hopelessly mar up the bright and shiny surface which the bumper possessed when it left the factory. Various expedients have been adopted for protecting these bumpers. Each car must not only guard its own bumper from injury, but must also put devices upon it to protect other bumpers with which it may come into engagement.

In the drawing I have illustrated my invention as applied to a bumper designated by the reference character 7, the bumper in this instance being in the form of a thin, wide bar having a concavo-convex form, the convex surface being that which is presented outwardly of the automobile and is most visible to the eye. In the drawing it is the surface which is shown in Fig. 1 and the surface in Fig. 2 which is toward the left-hand side of the sheet. This surface is generally highly polished and frequently is plated with some metal, at the present time chromium being very much in demand. Although chromium is a hard metal, yet when applied as a plating to these bumpers it does not resist rough contacts.

The preferred form of my bumper guard is a continuous open ended band composed of vulcanized rubber. This band may, for convenience, be described as comprising three parts, an outer cushioning or protecting portion 8, an inner cushioning and gripping member 9, and the connecting end or member 10. In referring to the portion 8 as an outer portion it might also be called a front portion because it is the portion which is toward one looking at the device when in position on an automobile, and is also the portion which directly receives the blows or impacts from various devices, particularly the bumpers of other automobiles.

Assuming that the device is to be applied to a bumper bar substantially in the form illustrated; that is one which curves outwardly toward its center, the inner face 11 of the front portion 8 is given a form substantially corresponding to the form of the bumper on which it is intended to be mounted. Of course the mass of rubber is sufficiently soft and yielding that the exact form of the face 11 does not control the application of the device because it will yield to conform to bars of various formation. This face 11 is preferably slightly longer than the width of the bumper, but should not be very much longer. The member 9 is also provided with a bumper engaging face 12 which also conforms substantially to the rear face of the bumper. This rear engaging portion 12 is preferably shorter than is the width of the bumper. This shortening preferably effected by reducing the quantity of stock leaves depressions 13 and 14 at the top and bottom of the portion which is furnished with the face 12. These depressions 13 and 14 afford a surer grip of the mass of rubber at 12, and the portions 15 and 16 assure greater flexibility both at the closed end 10 of the band and at the lower or open end which carries one of the interlocking members 17, presently to be described.

When reference is made to the upper and lower ends of the guard these terms are used in relation to the position the guard will usually occupy when in use. One would naturally put the open and interlocking end at the bottom, both for the purpose of making the joint at this part less conspicuous, and also to guard it against the entrance of water and oil. These substances, when they do find access to the locking device, and particularly to the box in which the member 17 is received, will have a tendency to impair and disintegrate the rubber. Another disadvantage of having this box at the top of the bumper is that the water which finds access to it in use, either from the road, or from rain, or from washing, will, no matter how carefully one might dry the device afterwards, have a tendency to seep out and mar the polished surface of the bumper.

The member or protuberance 17 is shown provided on its lower side, which is the side away from the bumper receiving cavity 18, with a hook or locking member 19. The protuberance 17 is adapted, when the portions 8 and 9 are pressed toward each other, to enter the box 20, such box opening toward the end 21 of the band which carries the protuberance 17. Within the box is formed a locking ledge 22 located in position to interlock with the locking member 19 when the ends 21 and 23 are brought together.

When the locking members are in their interlocked position the bumper engaging faces 11 and 12 are preferably brought into close engagement with the faces of the bumper. When the parts are brought into their interlocking position and there is no bumper in the space 17 these faces 11 and 12 are preferably disposed at a distance apart less than the thickness of the bumper bar.

A continuous steel spring 24 is preferably embedded within the rubber band and has one end 25 located in position to reinforce the locking member 22 within the box 20, and having its other end 26 located in position to reinforce the locking member 19 carried by the protruding member 17. This spring is shown passing throughout the length of the members 8 and 9 and curving in a loop as at 27 through the closed end 10 of the band. The steel spring 24 is shown as being sharply bent inwardly at 30 toward the bumper engaging face 11 rearwardly of the open box, but in position to be reinforced by the lower end of the bumper for the purpose of shortening the effective length of the spring rearwardly of its reinforcing end 25.

It will be seen, particularly by reference to Fig. 2, that the steel spring from this inward bend 30 passes the box to the place where it reinforces the ledge 22, thus practically surrounding the box. It might here be observed that a piece of spring steel, hardened and tempered, when located within a rubber device such as this, is not readily cut by any implement which would be in the hands of one tempted to remove the guard from the bumper. In fact it is one of the objects of my invention to so organize and construct this device that it cannot be removed from the bumper except by its complete destruction.

The part of the spring 24 which carries the hooked over end 19 has a portion 28 which is disposed at substantially right angles to the portion 29 of the spring which extends practically from end to end of the rear portion 9 of the guard. This portion 29, just above the right angle bend, is in a position to be reinforced by the lower edge of the bumper.

For purposes of economy in the quantity of rubber employed it is desirable to make the front portion 8 somewhat wider, particularly in its center portion, than is the rear part 9. It is also desirable to put a larger mass of rubber in this portion which is really the blow receiving part of the device.

When it is desired to apply this guard to a bumper it is preferably applied to the bumper from the upper edge; that is by passing the free ends of the rubber band over the upper edge of the bumper and introducing it into the space 18. The guard is then brought into its proper position longitudinally of the bumper and the protuberance 17 is entered into the box 20, the locking member 19 being caused to snap past the locking ledge 22 in the open box whereupon, by virtue of the strength of the rubber and the reinforcement of the ends of the steel spring 24, the ends 21 and 23 of the open rubber band are securely and permanently locked together. In most installations it will be possible to move the guard longitudinally of the bumper guard for short distances. In other instances the faces 11 and 12 will be so close together that such longitudinal movement is practically impossible.

In molding and vulcanizing the device the two side members preferably occupy the relative positions illustrated in Fig. 3. The protuberance 17 is made to closely and preferably tightly fit into the box portion 20. By this means when the device is placed upon a bumper and the sides pressed together forcing the protuberance 17 into the box 20 after the locking members have become engaged the guard is permanently locked on the bumper. When the protuberance 17 is forced into the box and the interlocking members engage even though there be no bumper or any other body in the space 18 the parts are permanently locked.

This feature of the permanent locking of the parts even when the device has been closed might at first appear to be a decided disadvantage for one might say that prospective purchasers will want to see it snapped together. It is believed that a drawing something like the sectional view of Fig. 2 will satisfy customers. I have found by experience that a small length of a wooden dowel pin placed in the box after the device has been vulcanized is sufficient to prevent accidental locking of the parts and the dowel pin cannot readily fall out until the parts are slightly separated, as for instance when the device is to be applied to a bumper.

Although but one form of my invention has been illustrated herein, which form I now regard as the preferred form, yet it will be apparent that various changes may be made within the scope of the claims without departing from the spirit of my invention.

Having thus described my invention, what I claim and desire to secure by Letters Patent is:

1. A mass of rubber formed as a continuous open ended band constructed and adapted to be passed about a thin bar, and formed at its ends with cooperative members capable of interlocking one with the other when the ends are brought closely together.

2. A mass of rubber formed as a continuous open ended band, one of such ends being formed with a box opening toward the other end and a locking ledge formed within the box, the other of said ends being formed with a protuberance adapted to enter the said open box and having a locking member adapted to snap past the locking member within the box.

3. A mass of rubber formed as a continuous open ended band, one of such ends being formed with a box opening toward the other end and a locking ledge formed within the box, the other of said ends being formed with a protuberance adapted to enter the said open box and having a locking member adapted to snap past the locking member within the box, and a spring steel band embedded within such rubber band and having one end located in position to reinforce the locking member within the box, and having its other end located in position to reinforce the locking member carried by the said protuberance.

4. A mass of rubber formed as a continuous open ended band and having faces formed for engaging a bar at its respective sides, one of such ends being formed with a box opening toward the other end and a locking ledge formed within the box, the other of said ends being formed with a protuberance adapted to enter the said open box and having a locking member adapted to snap past the locking member within the box, and a spring steel band embedded within such rubber band and having one end located in position to reinforce the locking member within the box, and having its other end located in position to reinforce the locking member carried by the said protuberance, the steel spring being sharply bent inwardly toward the bar engaging face rearwardly of the said open box for the purpose of shortening the length of the spring rearwardly of its reinforcing end.

5. A mass of rubber formed as a continuous open ended band and having faces formed for engaging a bar at its respective sides, one of such ends being formed with a box opening toward the other end and a locking ledge formed within the box, the other of said ends being formed with a protuberance adapted to enter the said open box and having a locking member adapted to snap past the locking member within the box, and a spring steel band embedded within such rubber band and having one end located in position to reinforce the locking member within the box, and its other end being formed as a bent-over hook located in position to reinforce the locking member carried by the said protuberance, the steel spring being sharply bent inwardly toward the bar engaging face rearwardly of the said open box for the purpose of shortening the length of the spring rearwardly of its reinforcing end, the end of the spring within the protuberance having its body portion located near the bar engaging face at
5 that portion, and having the part which carries the bent-over hooked end disposed at substantially right angles thereto.

6. A mass of rubber formed as a continuous open ended band, one of such ends being formed with a box opening toward the other end and a locking ledge formed within the box, the other of said ends being formed with a protuberance adapted to enter the said open box and having a locking member adapted to snap past the locking member within the box, and a spring steel band embedded within such rubber band having a portion surrounding the box and having one end located in position to reinforce the locking member within the box, and having its other end located in position to reinforce the locking member carried by the said protuberance.

7. A mass of rubber formed as a continuous open ended band constructed and adapted to be passed about a thin bar, and having faces formed for engaging a bar at its respective sides, one side of such band being wider and more massive than the other side, the band being formed at its ends with cooperative members capable of interlocking one with the other when the ends are brought closely together.

Signed at Rahway, New Jersey, this 18th day of April, 1932.

WALTER C. JACKSON.